Patented Sept. 11, 1923.

1,467,546

UNITED STATES PATENT OFFICE.

RICHARD D. JORDAN, OF HIGH BRIDGE, NEW JERSEY, ASSIGNOR TO TAYLOR-WHARTON IRON AND STEEL COMPANY, OF HIGH BRIDGE, NEW JERSEY, A CORPORATION OF NEW JERSEY.

METHOD OF MELTING FERROMANGANESE.

No Drawing. Application filed June 2, 1922. Serial No. 565,436.

*To all whom it may concern:*

Be it known that I, RICHARD D. JORDAN, a citizen of the United States, residing at High Bridge, in the county of Hunterdon and State of New Jersey, have invented certain new and useful Methods of Melting Ferromanganese, of which the following is a specification.

This invention relates to the melting of ferro-manganese in the cupola, and has for its objects, (1) reduction in the quantity of limestone employed; (2) reduction in loss of ferro-manganese; (3) reduced corrosion of cupola lining; and (4) cleaner cupola drop at the end of the run.

The usual practice of melting ferro-manganese in the cupola is to charge alternate layers of ferro-manganese, coke, and a fluxing agent. The latter generally consists of a dolomitic limestone and broken brick bats in the approximate proportion of two to one, the exact ratio depending upon the amount of limestone necessary to produce a fluid slag. By dolomitic limestone, I mean a limestone analyzing 50 to 60 per cent $CaCO_3$ and 40 per cent $MgCO_3$, with small quantities of iron, silicon and aluminum oxids; such a limestone, however, might contain greater or less proportions of $CaCO_3$ and a less or greater proportion of $MgCO_3$. In this operation there is always a considerable loss of ferro-manganese. For example, a loss of six to ten per cent, according to the physical condition of the ferro-manganese, the quantity melted, and the care exercised in the melting. Some of the ferro-manganese is lost by volatilization and some of it is lost in the slag in the form of manganese oxids.

I have discovered that by using a limestone containing more than 95 per cent $CaCO_3$ instead of a dolomitic limestone, I obtain a perfectly suitable slag with half the quantity of limestone heretofore required. The effect of this reduction is to decrease the slag volume, and the net result is less loss of ferro-manganese, less corrosion of the cupola lining, and a cleaner cupola drop at the end of the run. The percentage of manganese oxid in the slag is substantially the same as in the old practice, namely from 40 to 45 per cent, but since the slag volume is materially reduced there is a corresponding reduction in the loss of ferro-manganese, amounting to from one to two per cent of the ferro-manganese charged.

Having described my invention, I claim:—

1. The method of reducing the loss of ferro-manganese in the cupola melting of ferro-manganese, which consists in conducting the melting under conditions tending to small slag volume and with a slag forming material including limestone of a predetermined high degree of purity.

2. The method of reducing the loss of ferro-manganese in the cupola melting of ferro-manganese, which consists in conducting the melting under conditions tending to small slag volume by utilizing a slag forming material substantially free from $MgCO_3$.

3. The method of reducing the loss of ferro-manganese in the cupola melting of ferro-manganese, which consists in conducting the melting under conditions tending to small slag volume by utilizing limestone containing a predetermined high per cent of $CaCO_3$.

4. The method of reducing the loss of ferro-manganese in the cupola melting of ferro-manganese, which consists in decreasing the slag volume by utilizing limestone containing substantially 95 per cent of $CaCO_3$.

5. That improvement in the cupola melting of ferro-manganese, which consists in effecting a material reduction in slag volume by utilizing limestone containing a predetermined high per cent of $CaCO_3$ and substantially free from $MgCO_3$.

6. That improvement in the cupola melting of ferro-manganese, which consists in effecting a material reduction in slag volume by utilizing limestone substantially free from impurities and analyzing in excess of 95 per cent $CaCO_3$.

7. The method of melting ferro-manganese in a cupola, which consists in charging the cupola with alternate layers of ferro-manganese, fuel and a low volume slag producing material including limestone containing essentially 95 per cent or more of $CaCO_3$, and melting the charge.

8. The method of melting ferro-manganese in a cupola, which consists in effecting the melting under conditions for keeping the slag volume low, with a consequent reduction in the loss of ferro-manganese, less corrosion of the lining, and a cleaner cupola drop at the end of the run, by utilizing a limestone containing a predetermined high per cent of $CaCO_3$ and substantially free from $MgCO_3$, the amount of limestone used being substantially half the quantity heretofore required.

In testimony whereof I affix my signature.

RICHARD D. JORDAN.